(12) United States Patent
Pittu et al.

(10) Patent No.: US 10,977,402 B2
(45) Date of Patent: *Apr. 13, 2021

(54) CIRCUIT TESTING AND MANUFACTURE USING MULTIPLE TIMING LIBRARIES

(71) Applicant: Taiwan Semiconductor Manufacturing Co., Ltd., Hsinchu (TW)

(72) Inventors: Ravi Babu Pittu, Hsinchu (TW); Chung-Hsing Wang, Hsinchu (TW); Sung-Yen Yeh, Pingtung (TW); Li Chung Hsu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,210

(22) Filed: Nov. 6, 2019

(65) Prior Publication Data

US 2020/0074030 A1 Mar. 5, 2020

Related U.S. Application Data

(63) Continuation of application No. 15/703,781, filed on Sep. 13, 2017, now Pat. No. 10,503,849.

(Continued)

(51) Int. Cl.
*G06F 17/50* (2006.01)
*G06F 30/3312* (2020.01)
(Continued)

(52) U.S. Cl.
CPC ........ *G06F 30/3312* (2020.01); *G06F 30/367* (2020.01); *G06F 30/39* (2020.01); *G06F 2119/12* (2020.01)

(58) Field of Classification Search
USPC .................. 716/104, 106, 108, 111, 113
See application file for complete search history.

(56) References Cited

U.S. PATENT DOCUMENTS 7,216,050 B1 * 5/2007 Bachman ........... G01R 31/3171
702/108
8,479,130 B1 * 7/2013 Zhang ..................... G06F 30/30
716/106

(Continued)

*Primary Examiner* — Brian Ngo
(74) *Attorney, Agent, or Firm* — Duane Morris LLP

(57) ABSTRACT

A method and system for manufacturing a circuit is disclosed. In some embodiments, the system includes: at least one processor configured to: generate a first timing library for a first set of circuit elements for a first set of input parameters based on device characteristics for each of the circuit elements in the first set of circuit elements, and storing the determined device characteristics in a database; and generating a second timing library for a second set of circuit elements for a second set of input parameters based on device characteristics previously stored in the database for a first subset of the second set of circuit elements and determining device characteristics for a second subset of the second set of circuit elements using one of an aging simulation or a stress simulation; and a circuit generation system, coupled to the at least one processor, the circuit generation system configured to form a circuit on a substrate, wherein the circuit includes at least one of the first set of circuit elements or the second set of circuit elements.

20 Claims, 5 Drawing Sheets

Related U.S. Application Data

(60) Provisional application No. 62/434,676, filed on Dec. 15, 2016.

(51) Int. Cl.
*G06F 30/39* (2020.01)
*G06F 30/367* (2020.01)
*G06F 119/12* (2020.01)

(56) References Cited

U.S. PATENT DOCUMENTS

| | | | | |
|---|---|---|---|---|
| 8,522,183 | B1* | 8/2013 | McGuinness | G06F 30/3312 716/113 |
| 9,177,119 | B2* | 11/2015 | Potkonjak | G06F 21/10 |
| 2009/0187868 | A1* | 7/2009 | Jain | G06F 30/3312 716/113 |
| 2012/0123745 | A1* | 5/2012 | Sheu | G06F 30/367 703/2 |
| 2017/0103154 | A1* | 4/2017 | Jeon | G06F 30/39 |
| 2017/0255732 | A1* | 9/2017 | Milor | G11C 29/50004 |
| 2018/0096087 | A1* | 4/2018 | Hsu | G06F 30/367 |
| 2018/0173832 | A1* | 6/2018 | Pittu | G06F 30/39 |

* cited by examiner

CIRCUIT TESTING AND MANUFACTURE USING MULTIPLE TIMING LIBRARIES

CROSS-REFERENCE TO RELATED APPLICATION

This application is a continuation application of U.S. patent application Ser. No. 15/703,781, filed Sep. 13, 2017, which claims priority to U.S. Provisional Patent Application No. 62/434,676, filed on Dec. 15, 2016, both of which are incorporated by reference herein in their entireties.

BACKGROUND

Testing and manufacture of integrated circuits generally includes testing and characterization of the circuit over an expected operational lifetime. Conventional testing includes generation of a digital representation of the circuit elements (commonly referred to as a netlist) and simulation of the netlist in expected operation conditions over the expected operational lifetime. Testing of circuits generates timing libraries that include data regarding performance of the circuit elements at the expected operational life (commonly referred to as aging data).

Current timing library generation relies on a characterization process that requires stressing and aging modeling of all circuit elements for each expected operational lifetime that is tested. To create a new aging library for a different expected operational lifetime, logic cell stressing is repeated, even when prior characterization processes have performed identical stress simulation of the circuit elements.

BRIEF DESCRIPTION OF THE FIGURES

Aspects of the present disclosure are best understood from the following detailed description when read with the accompanying figures. It is noted that, in accordance with the standard practice in the industry, various features are not necessarily drawn to scale. In fact, the dimensions of the various features may be arbitrarily increased or reduced for clarity of discussion.

DETAILED DESCRIPTION

Figure 1:
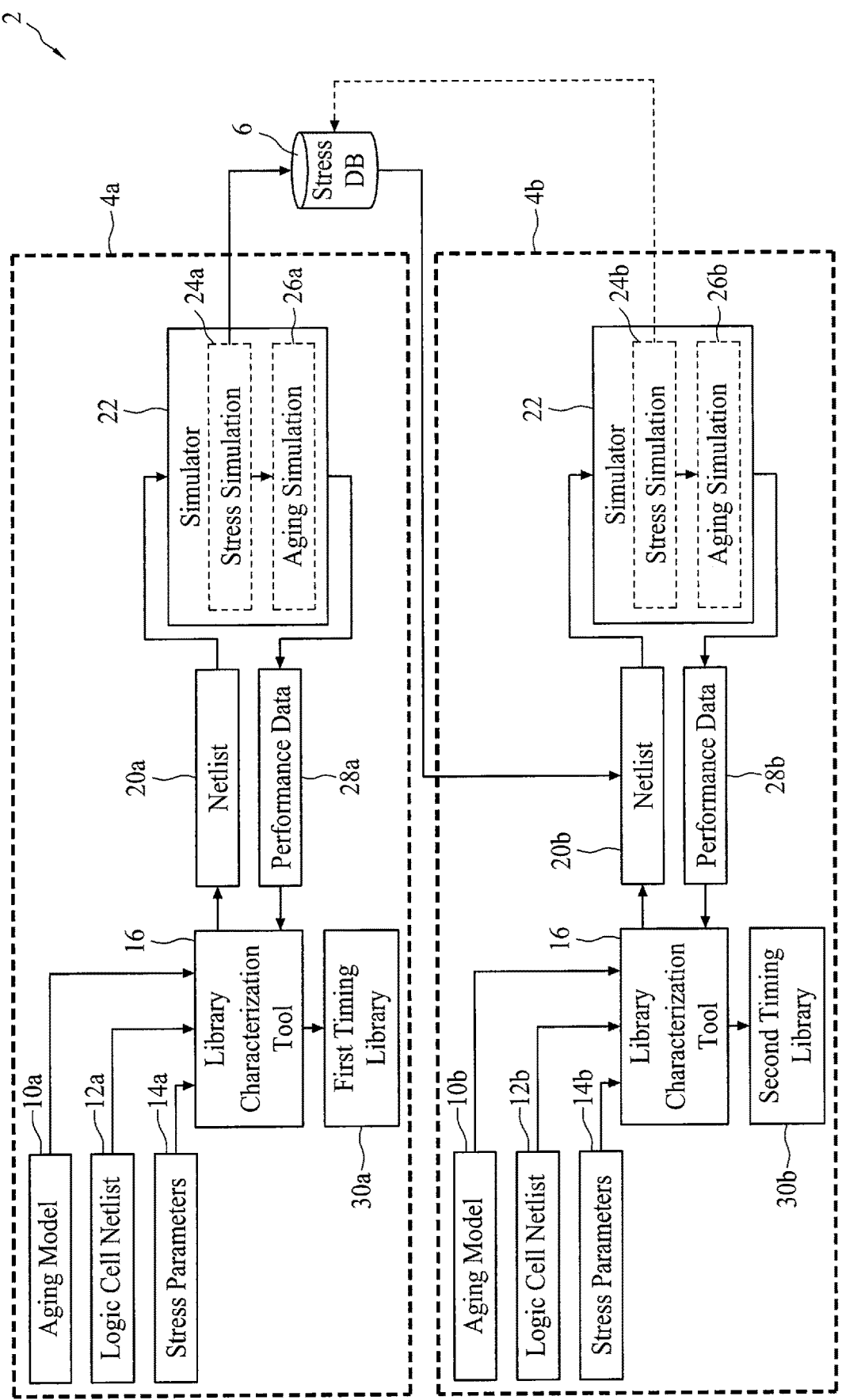
FIG. 1 illustrates a process flow of generating a plurality of library characterizations based on one or more stress parameters for use in circuit generation, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

In various embodiments, a method of generating a circuit including a plurality of circuit elements selected by generating a plurality of library characterizations for one or more circuit elements is disclosed. The method generates device characterizations that describe operation of the individual circuit elements over their respective operational lives. The device characteristics are generated during a first library characterization process and are reused in subsequent library characterizations for use in selecting one or more circuit elements for a circuit. The conventional characterization process requires generating device characteristics for each circuit element in a circuit during each timing characterization. For example, if three timing characterizations are performed, conventional characterization generates device characteristics for the same circuit elements three times, once during each timing characterization. In contrast, the methods disclosed herein reuse device characteristics generated in a first timing characterization for all subsequent timing characterizations of the same circuit or circuit elements. The reuse of device characteristics increases library characterization throughput (e.g., allows library characterization at a higher rate as each library characterization does not have to independently calculate device characteristics), reduces the required quantity of characterization resources, reduces the cost of generating library characterizations at any input parameters on demand, and decreases the time for circuit generation and production. Timing libraries, such as the timing libraries generated by the disclosed method, are used to implement digital circuit design, for example, during synthesis, physical design, sign-off, and/or other stages of digital circuit design. The disclosed method reduces run-time and complexity for each generated timing library, increasing throughput and decreasing processing time for generation, design, and/or verification of digital circuits.

FIG. 1 illustrates a process flow 2 of generating a plurality of library characterizations based on one or more stress parameters for use in circuit generation, in accordance with some embodiments. In some embodiments, a first (or initial) library characterization process 4a is performed by a system (such as the system 400 discussed with respect to FIG. 5 below) to generate a first timing library 30a. The timing library 30a includes timing and degradation information for a selected set of circuit elements in a circuit. The first library characterization 4a receives a plurality of input parameters 10a, 12a, 14a. The input parameters can include an aging model 10a, a representation of one or more circuit elements in the circuit, such as a logic cell netlist 12a, one or more stress parameters 14a, and/or any other suitable input parameters. In some embodiments, the input parameters are based on one or more operational requirements of a circuit.

In some embodiments, the aging model 10a includes data for simulating (or aging) one or more circuit elements over an operational life of the circuit element. For example, in some embodiments, the aging model 10a includes expected operational characteristics of a selected circuit element during normal operation and/or with one or more potential process variations. The process variations can be selected based on common and/or expected process variations found in the circuit element during a typical circuit generation process.

In some embodiments, the extracted logic cell netlist 12a identifies one or more circuit elements to be modeled during the library characterization 4a. For example, in some embodiments, all of the circuit elements are modeled during a library characterization 4a. In such embodiments, the extracted logic cell netlist 12a includes at least one representation of each logic cell (or circuit element) in the circuit. In other embodiments, a lesser number of the circuit elements are stressed and the extracted logic cell netlist 12a includes a representation of each of the selected circuit elements.

In some embodiments, the one or more stress parameters 14a include specific parameters for stressing the one or more circuit elements identified in the extracted logic cell netlist 12a. For example, in some embodiments, the stress parameters 14a include one or more process, voltage, or temperature (PVT) characteristics, a target expected life time characteristic, operational scenario characteristics, aging characteristics, and/or any other suitable elements for performing the timing characterization 4a. The stress parameters 14a can be generated based on one or more usage requirements of a selected circuit. Usage requirements can include, but are not limited to, expected life of the circuit, expected environmental conditions encountered by the circuit, number of usage cycles of the circuit, etc. In some embodiments, the stress criteria 14 can be provided in any suitable manner, such as, for example, a command input to the library characterization tool 16.

Each of the input parameters 10a, 12a, 14a are provided to a library characterization tool 16. The library characterization tool 16 generates a netlist 20a for PVT and signal integrated (SI) characterization for stressing of circuit elements represented in the logic cell netlist 12a. The netlist 20a is configured for characterization of stress effects from an initial time ($T_0$) to a targeted expected lifetime ($T_{TELT}$). The netlist 20a identifies circuit elements to be characterized for one or more of timing, power, variety, layout, and/or any other suitable circuit parameters. In some embodiments, the netlist 20a includes a subset of the circuit elements represented in the netlist 12a. For example, in some embodiments, the logic cell netlist 12a includes representations of each circuit element in a circuit and the netlist 20a represents a subsystem and/or selected number of circuit elements in the circuit.

A simulator 22 performs a simulation of the circuit elements represented in the netlist 20a received from the library characterization tool 16. In some embodiments, the simulator 22 can be integrated with and/or separate from a system performing the library characterization process 4a. A first stress simulation 24a is performed to generate device characteristics for each of the circuit elements in the netlist 20a to simulate PVT fluctuations and signal integration over the selected $T_{TELT}$. PVT fluctuations include effects on a circuit element that are caused by process, voltage, or temperature conditions of the circuit element. The stress simulation 24a simulates potential degradation and/or failure conditions for each of the circuit elements. For example, during manufacture, a circuit element can experience one or more process variations such that the circuit element has one or more parameters (e.g., voltage response, power usage, etc.) that fall within a range of expected values. The stress simulation 24a simulates circuit elements under a range of expected values based on one or more process variations to determine device characteristics of a circuit element. Signal integration characteristics include the signal response of the circuit element before and after the PVT fluctuations have been experienced. The device characteristics can include electrical characteristics and/or fluctuation information for each of the circuit elements represented in the netlist 20a. In some embodiments, the device characteristics can include, but are not limited to, active device electrical characteristic shifts, such as threshold voltage shift ($\Delta V_{th}$), drain current fluctuation including drain current under saturation region and drain current under linear region, gate leakage fluctuation, electrical characteristic shifts due to aging effects, self-heating effect (SHE), bias-temperature instability (BTI), hot carrier injection (HCI), time dependent gate oxide breakdown (TDDB), and/or any other suitable device characteristics. In some embodiments, the simulator 22 can include a SPICE (Simulation Program with Integrated Circuit Emphasis) simulator, although it will be appreciated that any suitable circuit simulator can be used.

In some embodiments, the device characteristics generated by the stress simulation 24a are stored in a stress database 6. The device characteristics can be stored using any suitable format, such as, for example, as a SPICE netlist. In some embodiments, the device characteristics are associated with the PVT and/or SI parameters of the stress simulation 24a. Once the stress database 6 is created during an initial library characterization 4a, the device characteristics in the stress database 6 can be reused during generation of one or more timing libraries at different input parameters during subsequent timing characterizations, as discussed in greater detail below.

The simulator 22 further implements an aging simulation 26a to simulate operation of the circuit elements over the selected $T_{TELT}$ according to the device characteristics generated during the stress simulation 24a. The aging simulation 26a generates performance data 28a of the selected circuit elements for the input parameters over the selected $T_{TELT}$. The performance data 28a can include timing, power, variation, and SI information for the circuit elements in the logic cell netlist 20a at both $T_0$ and $T_{TELT}$, although it will be appreciated that the performance data 28a can also include time periods between $T_0$ and $T_{TELT}$. The performance data 28a is provided to the library characterization tool 16 and is stored as a first timing library 30a. The first timing library 30a includes timing and/or power information for the selected circuit elements over the selected time period (i.e., between $T_0$ and $T_{TELT}$). In some embodiments, the first timing library 30a is used to identify one or more circuit elements in the logic cell netlist 12a that are acceptable and/or unacceptable for use in generating the selected circuit. In some embodiments, the first timing library is used to generate a circuit during a circuit generation process, as discussed in more detail below.

In some embodiments, a subsequent (e.g., second) library characterization 4b is performed to generate a subsequent timing library 30b. The subsequent library characterization 4b is similar to the first library characterization 4a described above. The subsequent library characterization 4b receives input parameters such as an aging model 10b, an extracted logic cell netlist 12b, one or more stress criteria 14b, and/or any other suitable input parameters. The input parameters 10b, 12b, 14b can include similar, additional, and/or alternative input parameters as the first library characterization 4a. For example, in some embodiments, the aging models 10a, 10b and the logic cell netlist 12a, 12b are the same, but the one or more stress criteria 14b for the subsequent timing characterization 4b includes a different targeted expected life time ($T_{TELT}$) as compared to the first library characterization 4a. The input parameters 10b, 12b, 14b are provided to the library characterization tool 16.

The library characterization tool 16 generates a netlist 20b for PVT and SI characterization of the logic cell netlist 12b. In some embodiments, the library characterization tool 16 generates the netlist 20b by reusing at least a portion of the device characteristics for the netlist 20a stored in the database 6. For example, in some embodiments, the library characterization tool 16 can load one or more of the device characteristics for one or more circuit elements in the logic cell netlists 12b from the database 6. In some embodiments, the library characterization tool 16 generates PVT and signal integrated (SI) characterization for stressing of circuit elements if such characterization was not generated during a prior characterization. For example, if the logic cell netlist 12b includes circuit elements not included in the logic cell netlist 12a, the library characterization tool 16 generates PVT and SI characterizations for the non-overlapping circuit elements. The loaded device characteristics and/or the generated device characteristics are combined to generate a netlist 20b configured for characterization of stress effects for the circuit elements include in the logic cell netlist 12b.

In some embodiments, the netlist 20b, including the device characteristics loaded from the database 6, are used in a stress simulation 24b and/or an aging simulation 26b to generate circuit performance data 28b over a $T_{TELT}$ specified in the stress criteria 14b. In some embodiments, a stress simulation 24b is performed only if the netlist 12b includes elements without device characteristics stored in the database 6. For example, if the loaded device characteristics contain stress information for all of the circuit elements in a selected circuit (e.g., the logic cell netlist 12a represented the entire circuit), the simulator 22 can skip the stress simulation 24b and perform the aging simulation 26b using only the previously generated device characteristics. As another example, if the loaded device characteristics contains information for some but not all circuit elements in the logic cell netlist 12b, the simulator 22 can perform a stress simulation 24b for only those circuit elements for which stress information was not previously generated. In other embodiments, a stress simulation 24b can be performed for all circuit elements in the logic cell netlist 20b.

In some embodiments, an aging simulation 26b is performed using the device characteristics retrieved from the database 6 and/or generated by the optional stress simulation 24b. The aging simulation 26b exports performance data 28b including timing, power, variation, and SI information for the circuit elements in the logic cell netlist 12b at both $T_0$ and the second $T_{TELT}$. In some embodiments, the performance data 28b is provided to the library characterization tool 16 for subsequent review and/or use in a circuit generation process, as discussed in more detail below. The library characterization tool 16 can store the performance data 28b as a subsequent timing library 30b. The use of previously generated device characteristics reduces the required resources used during the timing library characterization 4b, increases the library characterization throughput, and reduces the cost of creating aging libraries such that aging libraries can be generated for any circuit at any aging time point on demand.

For example, in some embodiments, the use of previously generated device characteristics reduces system resources by eliminating subsequent stress simulations. The system can generate multiple timing libraries using only a single stress simulation, as discussed in more detail with respect to FIG. 2. As another example, a greater number of library characterization processes 4a, 4b can be performed as compared to conventional library characterization due to the elimination of stress simulations, decreasing the time required for the simulator 22 to simulate each set of input parameters. For example, in some embodiments, the use of previously generated device characteristics reduces the run time of timing library generation by about half. Although embodiments are discussed herein with regards to a reduction in run-time, it will be appreciated that reductions in run-time of timing library generation inherently result in performance and system improvements, such as decreased use of system resources, decreased overall circuit design time, and increased throughput of digital circuit design systems, to name just a few.

Figure 2:
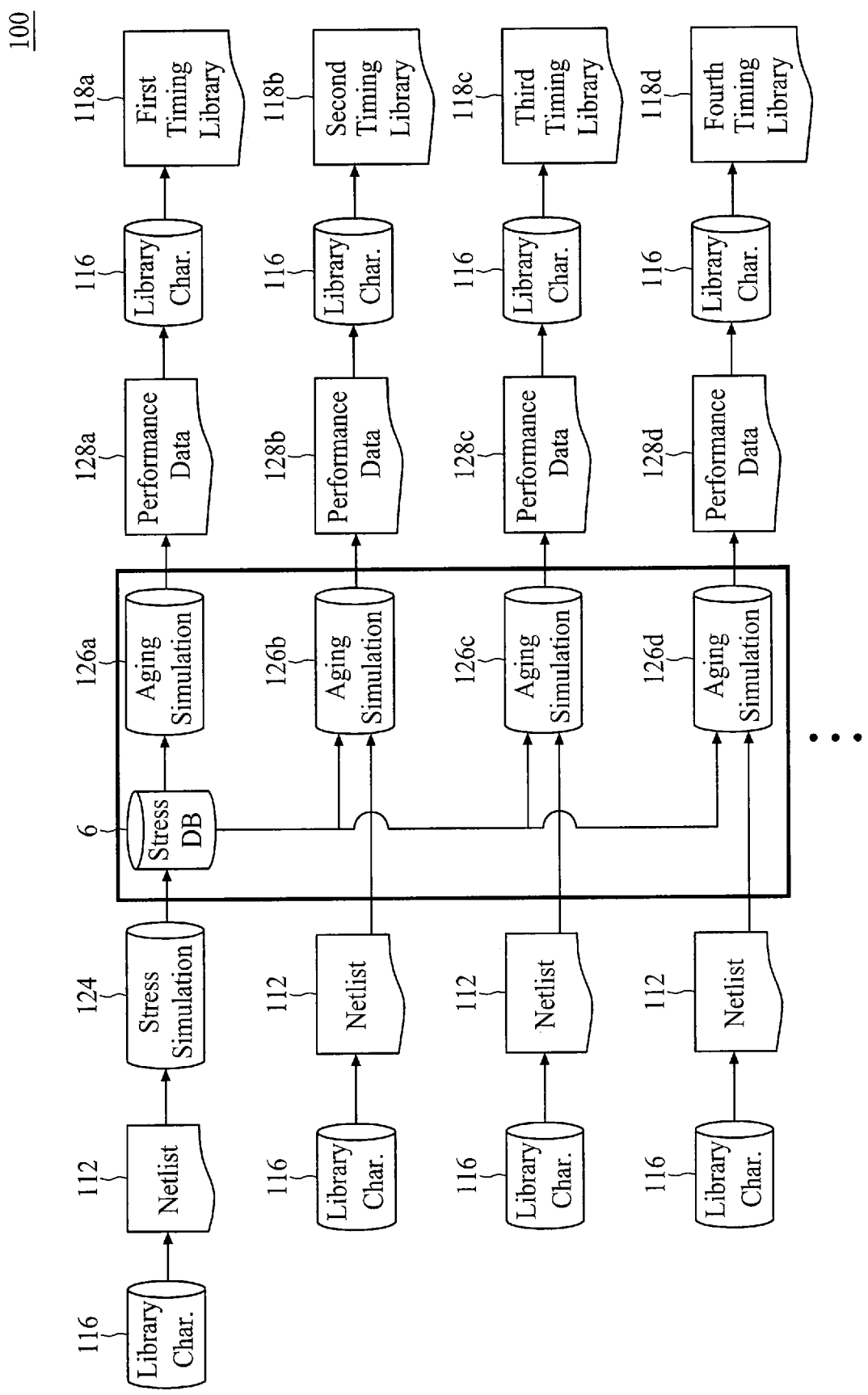
FIG. 2 illustrates a process flow of generating a plurality of timing libraries using a single stress simulation, in accordance with some embodiments.

FIG. 2 illustrates a process flow 100 of generating a plurality of timing libraries 118a-118d using a single stress simulation 124 for a selected circuit, in accordance with some embodiments. The process 100 includes generation of a first aged timing library 118a. A library characterization (char.) tool 116 generates a netlist 112 representative of the circuit elements in a selected circuit. The library characterization tool 116 and the netlist 112 are similar to the library characterization tool 16 and the netlist 12a discussed above, and similar description is not repeated herein. A stress (or degradation) simulation 124 is performed on a selected set of logic cells in the netlist 112. The stress simulation 124 generates device characteristics for each of the circuit elements in the netlist 112. The device characteristics can be stored in a database 106. The device characteristics are provided to a first aging simulation 126a. The first aging simulation 126a is configured to generate a timing library 118a for a first targeted expected lifetime ($T_{TELT}$). For example, in the illustrated embodiment, the first aged timing library 118a includes a first $T_{TELT}$ of three years.

The first aging simulation 126a generates a first set of performance data 128a for the circuit elements in the circuit over the first $T_{TELT}$. The first set of performance data 128a can be provided to the library characterization tool 116 and is stored as a first timing library 118a The first timing library 118a can be used in a circuit generation process, as discussed in more detail below with respect to FIG. 4.

After generating the first aged timing library 118a, the process 100 generates a plurality of subsequent timing libraries 118b-118d each having a different $T_{TELT}$. For example, a second timing library 118b can be generated for a second $T_{TELT}$, such as five years. The second timing library 118b is generated by the library characterization tool 116. The library characterization tool 116 utilizes the same netlist 112 as used to generate the first timing library 118a. Because the netlist 112 is the same, the second timing library 118b can be generated without performing a stress simulation 124. Instead, the device characteristics previously stored in the database 6 are loaded by a second aging simulation 126b configured to generate performance data 128b over the second $T_{TELT}$. The performance data 128 generated over the second $T_{TELT}$ is provided to the library characterization tool 116 and stored as a second timing library 118b.

Additional timing libraries 118c, 118d can be generated by loading the device characteristics from the database 6 and performing subsequent aging simulations 126c, 126d with different $T_{TELT}$ parameters. For example, in the illustrated embodiment, a third timing library 118c is generated by a third aging simulation 126c over a third $T_{TELT}$ of seven years and a fourth timing library 118d is generated by a fourth aging simulation 126d over a fourth $T_{TELT}$ of ten years. Although four timing libraries having various $T_{TELT}$ are illustrated, it will be appreciated that any number of timing libraries using any input parameters can be generated by utilizing device characteristics stored in a stress database 6.

Figure 3:
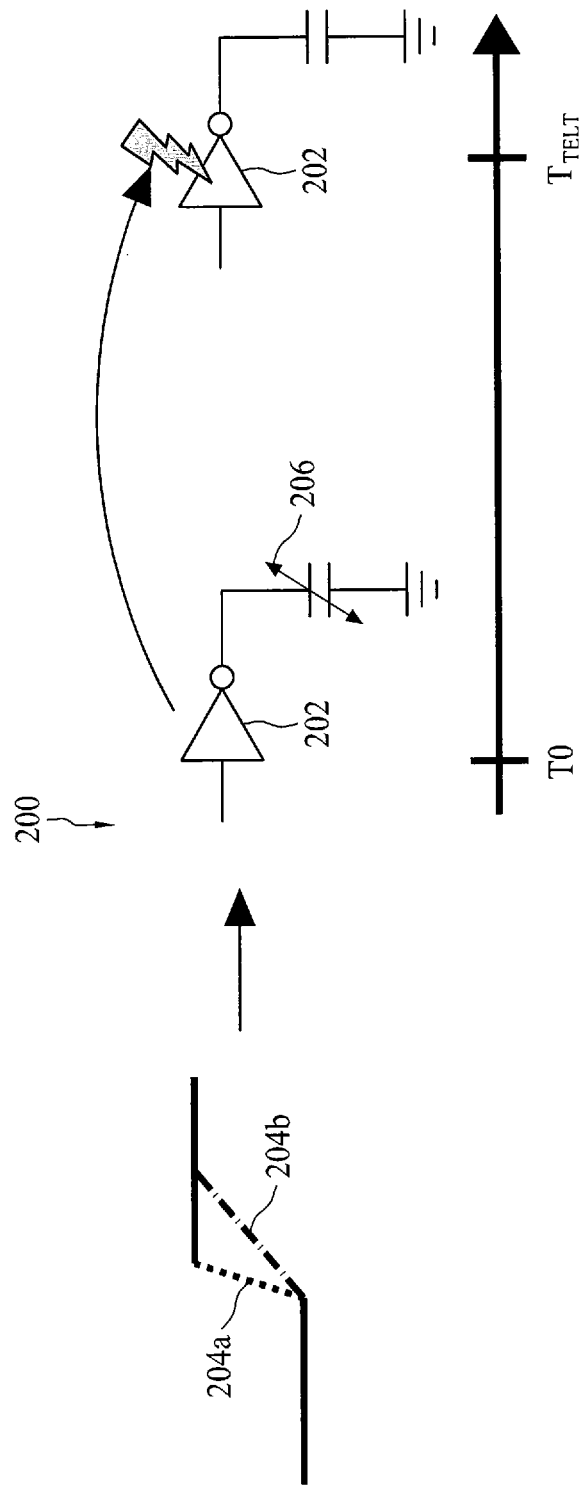
FIG. 3 illustrates a degradation profile of a circuit component over a selected targeted expected lifetime, in accordance with some embodiments.

FIG. 3 illustrates a device degradation profile 200 of a circuit element 202 from an initial time $T_0$ to a $T_{TELT}$. The circuit element 202 has a first response profile at 204a at time $T_0$. The first response profile 204a corresponds to a plurality of sweep output loads 206 that the circuit element 202 is capable of handling. At $T_{TELT}$ the circuit element 202 has a second response profile 204b, corresponding to degradation of the circuit element 202. In some embodiments, the second response profile 204b includes failure of the circuit element 202. Simulation of the circuit element 202 produces one or more device characteristics, such as power characteristics, of the circuit element 202 over the time period from $T_0$ to $T_{TELT}$. The first and second response profiles 204a, 204b are stored in a timing library corresponding to the $T_{TELT}$.

Figure 4:
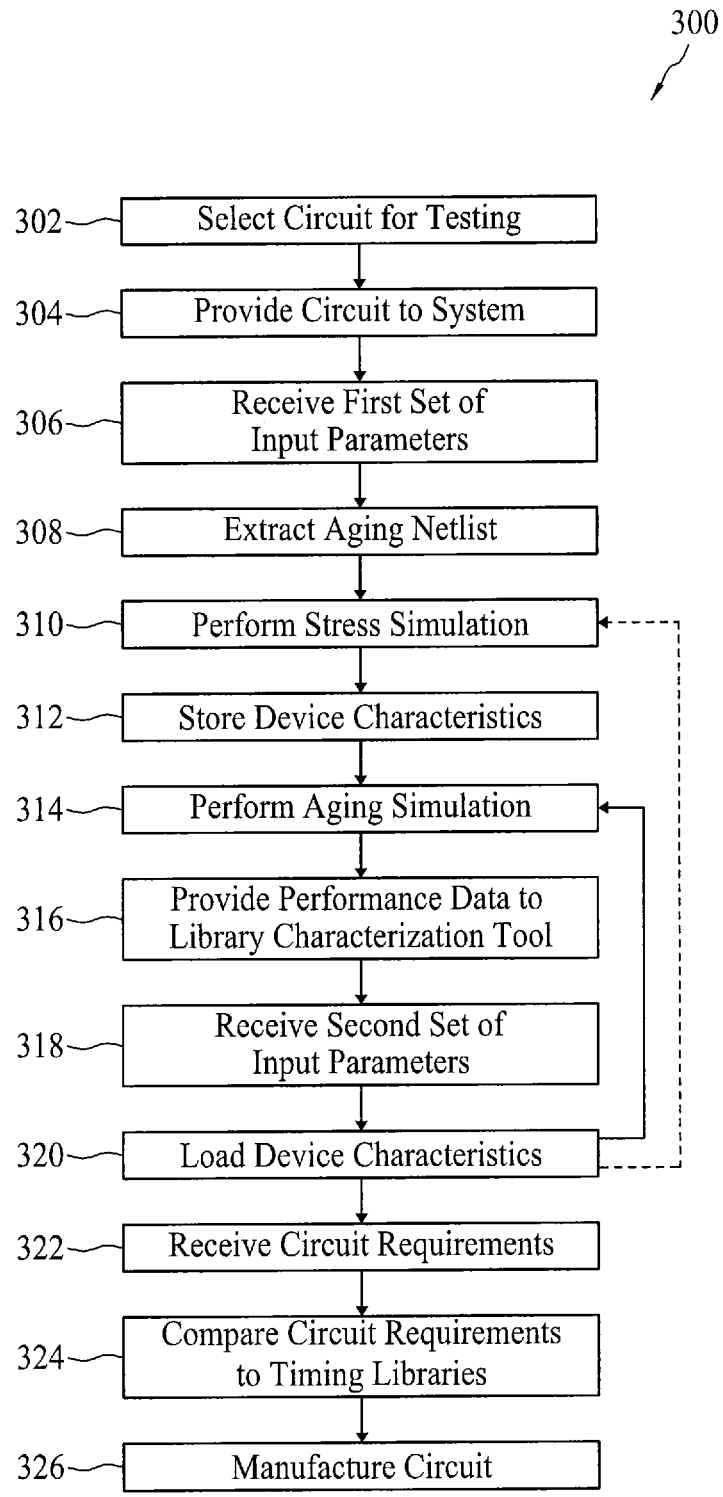
FIG. 4 is a flow chart illustrating a method of testing and generating a circuit, in accordance with some embodiments.

FIG. 4 illustrates a method 300 of testing and generating a circuit, in accordance with some embodiments. At step 302, a circuit including one or more circuit elements is selected for testing. The circuit can be selected from one or more previously designed circuits and/or designed according to one or more requirements, expected environmental parameters, and/or any other suitable parameters. The circuit can be designed according to any known circuit design process. At step 304, the selected circuit is provided to a system for timing library characterization. The system is configured to generate a plurality of timing libraries for the circuit over a plurality of parameters. At step 306, a first set of input parameters are provided to a library characterization tool 16 executed by the system. The first set of input parameters can include an aging model 10a, an extracted logic cell netlist 12a representing one or more circuit elements in the circuit, one or more aging criteria 14a, and/or any other suitable input parameters. At step 308, the library characterization tool 16 extracts an aging netlist 20a including circuit elements to be characterized. For example, circuit elements can be characterized according to timing, power, variety, SI data extraction, etc.

At step 310, a simulator 22 performs a stress simulation 24a of the aging netlist to generate device characteristics of the circuit elements. The device characteristics can include, but are not limited to, active device electrical characteristic shifts, such as threshold voltage shift ($\Delta V_{th}$), drain current fluctuation including drain current under saturation region and drain current under linear region, gate leakage fluctuation, electrical characteristic shifts due to aging effects, self-heating effect (SHE), bias-temperature instability (BTI), hot carrier injection (HCI), time dependent gate oxide breakdown (TDDB), and/or any other suitable device characteristics. At step 312, the generated device characteristics are provided to and stored in a database 6.

At step 314, the simulator 22 performs an aging simulation 26a to generate performance data 28 of the circuit elements over a first targeted expected lifetime ($T_{TELT}$). At step 316, the performance data is provided to the library characterization tool 16 and stored as a first timing library 30a.

At step 318, the library characterization tool 16 receives a second set of input parameters for a second timing library characterization. The second set of input parameters can include similar, additional, and/or alternative input parameters with respect to the first set of input parameters. For example, in some embodiments, the second set of input parameters includes the same aging model 10a and logic cell netlist 12a as the first set of input parameters but includes a second $T_{TELT}$.

At step 320, the library characterization tool loads one or more device characteristics from the database 6. The one or more device characteristics correspond to the circuit elements in the logic cell netlist 12a. The method 300 can optionally return to step 310 to perform a subsequent stress simulation 24b to generate device characteristics for any circuit elements not included in the database 6. For example, in some embodiments, if the second set of input parameters includes alternative and/or additional circuit elements as the first set of input parameters, a stress simulation 24b is performed to generate device characteristics for the alternative and/or additional circuit elements. Further, the method 300 can optionally return to step 312 to store additionally generated device characteristics in the database 6.

The method 300 returns to step 314 and performs a subsequent aging simulation 26b to generate performance data 28b for the circuit elements over the second $T_{TELT}$. The aging simulation 26a is performed using the device characteristics retrieved from the database 6 and/or generated during an optional subsequent stress simulation. At step 316, the generated performance data is provided to the library characterization tool 16 and stored as a subsequent (e.g., second) timing library 30b. Steps 318-320 can be performed to generate one or more additional timing libraries including different input parameters, such as, for example, a plurality of $T_{TELT}$ timings.

At step 322, a set of requirements for manufacture of a circuit is received. The set of requirements includes operational, performance, and other requirements for manufacture of a circuit. The set of requirements for manufacture is based on logic cell function, delay, power, area, constraint, noise information, and/or other circuit parameters identified and selected in one or more timing libraries generated in steps 302-320. For example, in some embodiments, the generated timing libraries 30a, 30b are used to synthesize, optimize, and verify transistor level power, performance, and/or design area constraints of a circuit for manufacture.

At step 324, the set of requirements is compared to one or more timing libraries generated by the system to select a circuit having performance data matching or exceeding the set of requirements. For example, in some embodiments, the set of requirements includes a specific set of circuit responses over a predetermined operational period. The system locates a timing library having the same (or greater) $T_{TELT}$ and compares the performance data of the timing library to the specific set of circuit responses. At step 326, the selected circuit is manufactured. The selected circuit can be manufactured according to any known process, such as, for example by forming the circuit on a substrate using a plurality of photomasks in a multi-patterning deposition process.

Figure 5:
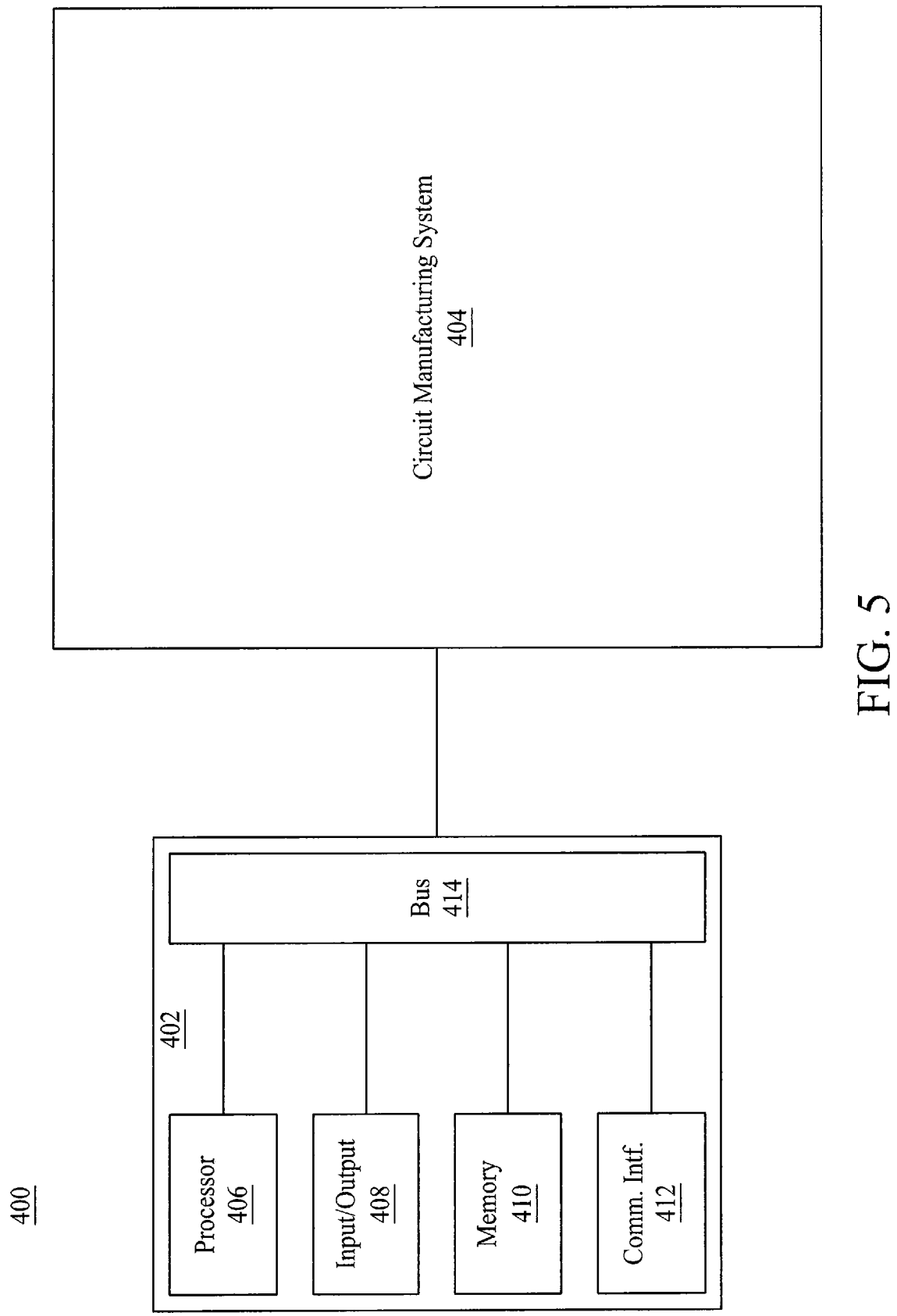
FIG. 5 illustrates a system configured to implement one or more of the methods described herein, in accordance with some embodiments.

FIG. 5 illustrates one embodiment of a system 400 for manufacturing a circuit according to one or more embodiments of the methods disclosed herein. The system 400 includes at least one electronic device 402 configured to control operation of a circuit generation system 404. The electronic device 402 is capable of implementing one or more of the methods or processes 2, 100, 300 described above. The circuit generation system 404 may generate a circuit according to one or more known methods. For example, in some embodiments, the circuit generation system 404 is configured to form a circuit on a substrate using a plurality of photomasks in a multi-patterning deposition process and/or other suitable circuit manufacturing process. The electronic device 400 is a representative device and may comprise a processor subsystem 406, an input/output subsystem 408, a memory subsystem 410, a communications interface 412, and a system bus 414. In some embodiments, one or more than one of the electronic device 402 components may be combined or omitted such as, for example, not including the communications interface 412. In some embodiments, the electronic device 402 may comprise other components not combined or comprised in those shown in FIG. 5. For example, the electronic device 402 also may comprise a power subsystem. In other embodiments, the electronic device 402 may comprise several instances of the components shown in FIG. 5. For example, the electronic device 402 may comprise multiple memory subsystems 410. For the sake of conciseness and clarity, and not limitation, one of each of the components is shown in FIG. 5.

The processor subsystem 406 may comprise any processing circuitry operative to control the operations and performance of the electronic device 402. In various aspects, the processor subsystem 406 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 406 also may be implemented by a controller, a microcontroller, an application specific integrated circuit (ASIC), a field programmable gate array (FPGA), a programmable logic device (PLD), and so forth.

In various aspects, the processor subsystem 406 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the electronic device 402 may comprise a system bus 414 that couples various system components including the processing subsystem 406, the input/output subsystem 408, and the memory subsystem 410. The system bus 412 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 408 may comprise any suitable mechanism or component to at least enable a user to provide input to the electronic device 402 and the electronic device 402 to provide output to the user. For example, the input/output subsystem 408 may comprise any suitable input mechanism, including but not limited to, a button, keypad, keyboard, click wheel, touch screen, or motion sensor. In some embodiments, the input/output subsystem 408 may comprise a capacitive sensing mechanism, or a multi-touch capacitive sensing mechanism.

In some embodiments, the input/output subsystem 408 may comprise a visual peripheral output device for providing a display visible to the user. For example, the visual peripheral output device may comprise a screen such as, for example, a Liquid Crystal Display (LCD) screen, incorporated into the electronic device 402. As another example, the visual peripheral output device may comprise a movable display or projecting system for providing a display of content on a surface remote from the electronic device 402. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of the processor subsystem 406. For example, the visual peripheral output device may be able to play media playback information, application screens for application implemented on the electronic device 402, information regarding ongoing communications operations, information regarding incoming communications requests, or device operation screens, to name only a few.

In some embodiments, the communications interface 412 may comprises any suitable hardware, software, or combination of hardware and software that is capable of coupling the electronic device 402 to one or more networks and/or additional devices (such as, for example, the circuit generating system 404.) The communications interface 412 may be arranged to operate with any suitable technique for controlling information signals using a desired set of communications protocols, services or operating procedures. The communications interface 412 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a circuit generating system 404, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery such as a circuit generating system 404, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, Fire-Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 412 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 412 may comprise a wireless interface comprising one or more antennas, transmitters, receivers, transceivers, amplifiers, filters, control logic, and so forth.

In various aspects, the communications interface 412 may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 410.

In some embodiments, the memory subsystem 410 may comprise any machine-readable or computer-readable media capable of storing data, including both volatile/non-volatile memory and removable/non-removable memory. The memory subsystem 410 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the electronic device 402.

In various aspects, the memory subsystem 410 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 410 may contain an instruction set, in the form of a file for executing a method of generating one or more timing libraries (for example, from one or more circuit layouts provided to the electronic device 402) as described herein. The instruction set may be stored in any acceptable form of machine readable instructions, including source code or various appropriate programming languages. Some examples of programming languages that may be used to store the instruction set comprise, but are not limited to: Java, C, C++,C #, Python, Objective-C, Visual Basic, or .NET programming. In some embodiments a compiler or interpreter is comprised to convert the instruction set into machine executable code for execution by the processing subsystem 406.

In various embodiments, a method includes generating a first timing library for a first set of circuit elements for a first set of input parameters. Generating the first timing library includes determining device characteristics for each of the circuit elements in the first set of circuit elements and storing the determined device characteristics in a database. A second timing library is generated for a second set of circuit elements for a second set of input parameters. The second timing library is generated by using one or more of the determined device characteristics previously stored in the database. A circuit is formed on a substrate. The circuit includes at least one of the first set of circuit elements or the second set of circuit elements.

In various embodiments, a method includes generating a set of device characteristics for a set of circuit elements. A first timing library is generated for the set of circuit elements for a first targeted expected life. The first timing library is generated using the set of device characteristics. A second timing library is generated for the set of circuit elements for a second targeted expected life. The second timing library is generated using a subset of the device characteristics. A circuit is formed on a substrate. The circuit includes the set of circuit elements.

In various embodiments, a method includes generating device characteristics for a set of circuit elements in a circuit. The device characteristics are stored in a database. A first timing library is generated using an aging model, a first subset of the circuit elements, and a first set of input parameters. The first timing library is generated using the stored device characteristics. The first timing library includes a first set of performance data for the set of circuit elements. The circuit is formed on a substrate when the first set of performance data meets or exceeds a predetermined performance threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for manufacturing a circuit, comprising:
at least one processor configured to:
generate a first timing library for a first set of circuit elements for a first set of input parameters based on device characteristics for each of the circuit elements in the first set of circuit elements, and storing the determined device characteristics in a database; and
generating a second timing library for a second set of circuit elements for a second set of input parameters based on device characteristics previously stored in the database for a first subset of the second set of circuit elements and determining device characteristics for a second subset of the second set of circuit elements using one of an aging simulation or a stress simulation; and
a circuit generation system, coupled to the at least one processor, the circuit generation system configured to form a circuit on a substrate, wherein the circuit includes at least one of the first set of circuit elements or the second set of circuit elements.

2. The system of claim 1, wherein the at least one process is further configured to perform a stress simulation of the first set of circuit elements, wherein the stress simulation determines the device characteristics for each of the circuit elements in the first set of circuit elements.

3. The system of claim 1, wherein the at least one process is further configured to perform an aging simulation of the first set of circuit elements based on the device characteristics for each of the circuit elements in the first set of circuit elements, and wherein the aging simulation generates performance data for the first set of circuit elements at the first set of input parameters.

4. The system of claim 1, wherein the aging simulation of at least a portion of the second subset of the second set of circuit elements is based at least in part on the device characteristics of the first set of circuit elements, and wherein the aging simulation generates performance data for the second set of circuit elements at the second set of input parameters.

5. The system of claim 1, wherein the stress simulation of the second subset of circuit elements in the second set of circuit elements determines device characteristics for each of the second subset of circuit elements.

6. The system of claim 1, wherein the device characteristics are selected from the group consisting of: active device electrical characteristic shifts, gate leakage fluctuation, electrical characteristic shifts due to aging effects, self-heating effect (SHE), bias-temperature instability (BTI), hot carrier injection (HCI), and time dependent gate oxide breakdown (TDDB).

7. The system of claim 1, wherein the first set of circuit elements and the second set of circuit elements are different.

8. The system of claim 1, wherein the first timing library and the second timing library are generated using one or more SPICE simulations.

9. The system of claim 1, wherein the first set of input parameters includes a first targeted expected life and the second set of input parameters includes a second targeted expected life.

10. A system for forming a circuit, comprising:
at least one processor configured to:
generate a first set of device characteristics for a set of circuit elements using a first set of input parameters;
generate a first timing library for the set of circuit elements for a first targeted expected life, wherein the first timing library is generated using the first set of device characteristics;
generate a second set of device characteristic for a subset of the set of circuit elements, wherein the second set of device characteristics are generated using a second set of input parameters; and
generate a second timing library for the second set of circuit elements for a second targeted expected life, wherein the second timing library is generated using a subset of the first set of device characteristics and the second set of device characteristics.

11. The system of claim 10, wherein the at least one process is further configured to perform a stress simulation of the set of circuit elements, and wherein the first set of input parameters includes at least one stress parameter.

12. The system of claim 11, wherein the at least one stress parameter includes power, voltage, and temperature (PVT) parameters or signal integration parameters.

13. The system of claim 10, wherein the at least one process is further configured to perform an aging simulation of the set of circuit elements over the first targeted expected life.

14. The system of claim 10, wherein the at least one process is further configured to perform an aging simulation of the set of circuit elements over the second targeted expected life.

15. The system of claim 10, wherein the subset of first device characteristics includes device characteristics for each circuit element in the set of circuit elements.

16. The system of claim 10, wherein the device characteristics are selected from the group consisting of: active device electrical characteristic shifts, gate leakage fluctuation, electrical characteristic shifts due to aging effects, self-heating effect (SHE), bias-temperature instability (BTI), hot carrier injection (HCI), and time dependent gate oxide breakdown (TDDB).

17. A system, comprising:
at least one processor configured to:
generate first device characteristics for a set of circuit elements in a circuit;
generate second device characteristics for the set of circuit elements in the circuit;
store the device characteristics in a database;
generate a first timing library using an aging model, a first subset of the circuit elements, and a first set of input parameters, wherein the first timing library is generated using the first device characteristics, and wherein the first timing library includes a first set of performance data for the set of circuit elements;
generate a second timing library using the aging model, a second subset of the circuit elements, and a second set of input parameters, wherein the second timing library is generated using a subset of the first device characteristics and the second device characteristics, and wherein the second timing library includes a second set of performance data for the set of circuit elements; and a circuit forming system configured to form the circuit on a substrate when the first set of performance data meets or exceeds a predetermined performance threshold.

18. The system of claim 17, wherein the circuit forming system is further configured to form the circuit on the substrate when the second set of performance data meets or exceeds the predetermined performance threshold.

19. The system of claim 18, wherein the first set of input parameters includes a first targeted expected lifetime and the second set of input parameters includes a second set of input parameters.

20. The system of claim 17, wherein the first device characteristics are generated by a stress simulation configured to simulate power, voltage, and temperature (PVT) or signal integration of the set of circuit elements.

* * * * *